Aug. 7, 1934.　　　J. P. TARBOX　　　1,969,108
METHOD OF MAKING WIRE WHEELS
Filed April 19, 1929　　　3 Sheets-Sheet 1
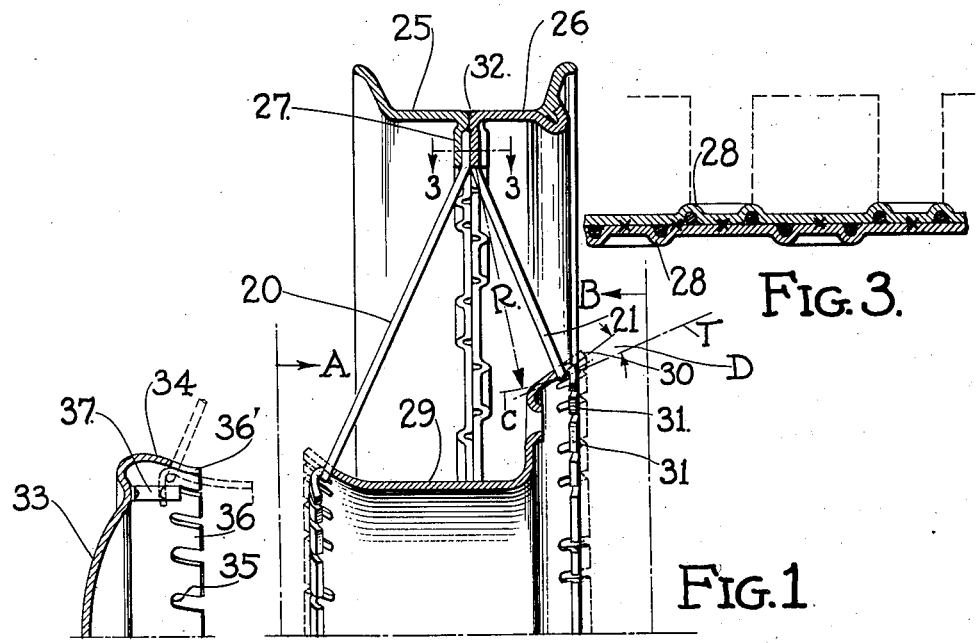
FIG. 3.
FIG. 4.
FIG. 1.
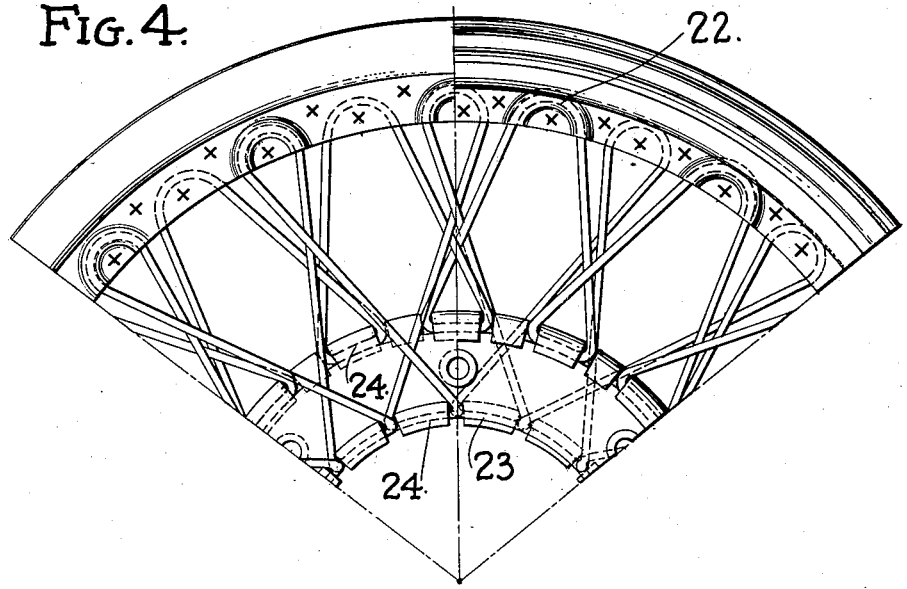
FIG. 2.
INVENTOR.
John P. Tarbox Aug. 7, 1934. J. P. TARBOX 1,969,108
METHOD OF MAKING WIRE WHEELS
Filed April 19, 1929 3 Sheets-Sheet 2

INVENTOR.
John P. Tarbox

Aug. 7, 1934.   J. P. TARBOX   1,969,108
METHOD OF MAKING WIRE WHEELS
Filed April 19, 1929   3 Sheets-Sheet 3

INVENTOR.

Patented Aug. 7, 1934

1,969,108

UNITED STATES PATENT OFFICE 1,969,108

METHOD OF MAKING WIRE WHEELS

John P. Tarbox, Philadelphia, Pa., assignor to Budd Wheel Company, Philadelphia, Pa., a corporation of Pennsylvania Application April 19, 1929, Serial No. 356,472

7 Claims. (Cl. 29—159.02)

The wire wheel of my invention is particularly adapted for use on light weight passenger cars, but it has also adaptation for use on heavy duty automobiles, and on other vehicles.

Its primary object is the cheapest and most economical production of a wire wheel for any duty having the requisite mechanical characteristics of that duty, as for example, strength, durability and quality.

In the main my invention is achieved by form winding the spoke bodies of these wheels in continuous annularly extended series, as distinguished from continuous series otherwise extended, and thereafter interconnecting the rims and hub by such series.

More specifically the spoke body is form wound into an annularly extending pattern which is substantially that which the spokes occupy in the completed wheel. Adjoining ends of the spokes are interconnected by loops, in the preferred form of my invention reversely bent in order to appropriately cross the spokes and give the spokes appropriate angles. These loops directly or reversely bent, as the case may be, are then interlocked, the outer and inner respectively with the rim and with the hub shell of the wheel.

Still further, my invention comprises the forming of the rim in two annular halves and interlocking the loops of the spokes between these halves.

Yet further, my invention contemplates the forming of tines on the end of a hub shell and the forcing of these tines through the inner loops by a wedging action, and then inwardly bending them to tension the spokes and retain them in place.

These features of my invention constitute a method of making the wire wheel, but my invention has also structural features which characterize the article so made with a particularity so as to render the article itself a primary part of my invention. This has particular reference to the rim and shell structures as related to the spoke body.

In the drawings I show several embodiments of my invention now known to me. Necessarily it has yet others.

Of the drawings,

Fig. 1 is an axial half section of a wheel constructed according to my invention.

Fig. 2 is a dual end elevation of a sector of such a wheel, the left half of the sector being taken from the outside of the wheel and the right half of the sector being taken from the inside of the wheel, the better to show the patterns of the spokes and their anchorages.

Fig. 3 is an annular cross section on line 3—3 of Fig. 1 showing the connections of the spokes to the rim.

Fig. 4 is an axial half cross section of hub cap for the wheel showing its method of attachment.

Figures 5, 6:
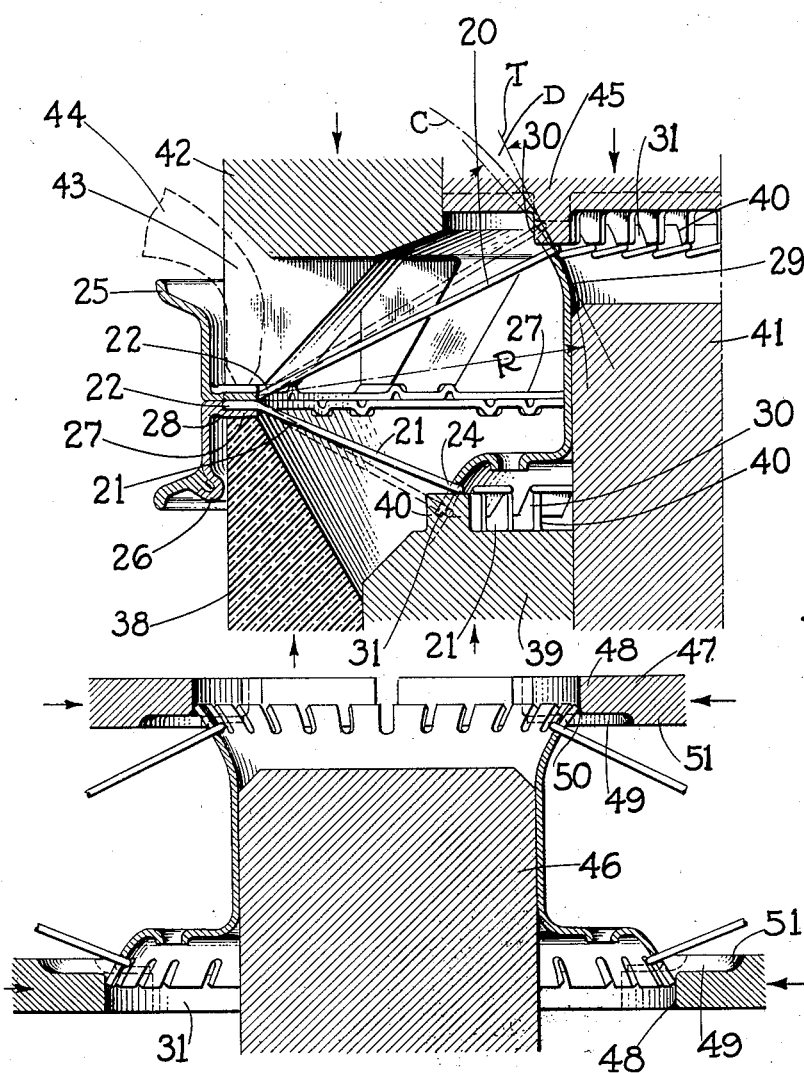
Fig. 5 is an axial half cross section showing assembly dies in certain of the initial operations of the assembly.
Fig. 6 is an axial cross section with the outer parts of the wheel broken away showing die operations of the final operations of assembly.

The wheel comprises as shown two groups of spokes, an outer group 20 and an inner group 21. The groups respectively comprise spokes in endless annularly extended series formed by interconnecting the adjoining ends of the spokes together by outer loops 22 and inner loops 23. The series is formed from endless stock and the ends of each series are preferably welded together to make the series endless by joining these ends by welding together in the bight 24 of one of the inner loops. Thus, the irregularity of the weld does not mar the exposed portions of the spokes between their ends, nor does it interfere with the interlocking of the outer loops 22 with the rim. The outer loops 22 are bent at an angle to the bodies of the spokes such that when the wheel is assembled, they occupy a plane truly radial with respect to the axis of the wheel.

The rim of the form shown in Fig. 1 is formed in two annular parts 25 and 26 which together constitute the rim in the main of standard form having a cylindrical main body, a flange on one side, and a gutter on the other, to receive a retaining flange substantially as shown. But the adjoining sides of these two parts are provided with inwardly projected flanges 27. These flanges are provided with depressions 28 staggered with respect to each other to receive alternately the loops 22 of the outer and inner rows of spokes 20 and 21. The form of these depressions 28 is preferably arc shaped and so related to the edges of the flanges 27 that the spoke bodies emerge from the depressions tangentially to their arcs. They are in this embodiment sufficiently deep to accommodate the full diameter of the spoke. They may, however, be made less deep and be formed partly in one flange 27 and partly in the other. The flanges 27 are spot welded together within the loops and between them. Additional arc welding may be applied in the seam itself as indicated by numeral 32.

The hub shell 29 is of conventional form in its main body. Its ends, however, are kerfed at 30 to provide tines 31 of the width of the inner-loops 24 and also of the spaces between the loops. The kerfs are of a width equal to the diameter of the spokes plus small clearance. The tines project through the inner loops 24 and between them on occasion and have their ends turned inwardly toward the axis of the wheel whereby the spokes are tensioned and held in place. The inner loops 24 instead of being arc shaped have flattened bights and where the loops are reversely bent are substantially triangular in form.

The outer end of the hub shell 29 is provided with a hub cap 33 having a flange 34 provided with notches 35 adapted to receive the bottoms of the spokes of the outer group 20. The tines 36 between the notches are slightly upturned as at 36' and are of an internal diameter slightly less than that of the external diameter of the hub shell whereby the cap may be forced into place over the end of the shell and held snugly in position by the tension under which the tines 36 are placed incident to their undersized diameter. Additionally, there may be used spring clips 37 projected through the kerfs 30 in interlocking relation therewith after the fashion of the glove fastener.

According to the method of my invention I construct the wheel as follows: The spokes of each of the groups 20—21 (or more if there are other groups needful) are wound on dies of the pattern which the spokes occupy in the completed wheel whereby they are formed simultaneously with the winding into an annularly extending series of the form of the series in the completed wheel. This pre-shapes all the loops and all of the relative angles of the spokes precisely to the shapes and angles which they are to have in the completed wheel. Each series is terminated preferably in the foot of one of the inner bights 24 and the ends are welded together in such manner that the terminal loop is of the dimension of the remaining loops. Preferably also the outer loops are given the proper angles to the body of the spoke in this same winding operation. In this wise all bending of the spoke groups on the jobs or otherwise fashioning of the spoke groups in any way is avoided, and absolute accuracy of dimension is assured. The spoke group so formed to the spoke pattern of the wheel is delivered in bulk and kept on the assembly floor in boxes or baskets. The rims are rolled sections of the material, and fabricated according to the usual processes in rim manufacture excepting that the bosses 28 are struck by dies in the completed rim sections 25—26 after the rims have been otherwise completely fabricated. The rim parts may be die formed in entirety or fashioned by other processes. The hub shell is formed by any of the usual methods in one or more parts, but one being illustrated in Fig. 1. The ends may be kerfed before or after the forming by any suitable method preferably by die stamping. The tines 31 are initially at an angle D with the tangent T to the arc C defined by a radius R struck in an axial plane from the inner edge of flange 27 to the inside of the inner loop 24. The inner diameter of the hub shell at the bottoms of the kerfs 30 is somewhat less than the outer diameter from the bottom of one inner-loop 24 to the bottom of the diametrical loop.

So fabricated the parts are assembled initially in a welding jig of the type shown in Fig. 5. The inner part 26 of the rim is held by flange 27 down upon the top of an outer annular welding die 38, the rim of which is formed complemental to the outside of the flange 27 whereby to make close continuous electric contact therewith. The die is preferably of good conducting material. Concentrically arranged with this die 38 is an inner die 39 axially movable with respect to the outer die 38 and provided with fins 40 adapted to enter the kerfs 30 of the inner end of the hub shell 29. The inner group 21 of the spoke as pre-formed is then laid with its outer loops in the bosses 28 of the annular rim part 26, and with its inner-loops 24 lying upon the tops of the fins 40. The fins 40 are initially further from the flanges 28 than in final assembly. Next the hub shell 29 is placed inner end down over a central concentric arbor 41 of the jig, the inner tines 31 being entered in the loops 24 and between them as the case may be and projecting down between the fins 40. Thereupon the outer group of spokes 20 is put in place by entering the inner loops of that group 20 in the kerfs 30 between the tines 31, the tines projecting through the loops, and by resting the outer loops 22 upon the flange 27 of the ring 26. The outer ring 25 of the rim is next put in place, closing all the outer spoke loops 22, the flanges 24 abutting each other and locking the spoke loops between them. The metal body of one flange projects through a loop and into contact with the metal body of the other flange. Thereupon an upper welding die 42 is lowered and forced down upon the upper flange 27 to clamp it firmly upon the lower flange 27 and rigidly connect the spokes. This upper die is discontinuous in its engagement face, being provided with spaced feet 43 complemental to spaced portions of the upper flange 27.

A portable welding tool 44 is projected between the feet 43 and spot welds made between the flanges within the loops and about as indicated by the cross marks in Fig. 3 to integrally join the annular rim parts 25 and 26 to each other. Simultaneously with this spot welding operation concentric upper inner die 45 is lowered into place in operative connection with the outer end of the hub shell 29. This die 45, like lower concentric die 39, is provided with fins 40. The fins in this case enter the kerfs 30 in the outer end of hub shell 29 and force the bights of the loops 24 down into the kerfs and through them force the shell 29 down on to the centering arbor 41, and still further force the inner tines 31 down into the inner spoke loops 24, thereby forcing home both groups of spokes to the bottoms of the kerfs. This forcing home by reason of the lesser innermost diameter of the tines 30 than the diameter of the bights of the loops exerts a wedge action in the direction to put the spokes of the groups 20 and 21 in initial tension. The wheel is then transferred to a closing in machine in the form shown in Fig. 6 in which its hub shell 29 is centered on an arbor 46. This machine is equipped with radially acting dies 47 segmental in form and operated by a mechanism (not shown) similar to that used in the well known contracting machine, used for contracting rims. Dies 47 have their ends shaped to engage the tines 31 and turn them radially inwardly towards the axis of the wheel. To this end their ends are provided with an axially extending portion 48 connected with a radially extending portion 49 by a curved section 50.

The radially extending section 49 extends radially downwardly a distance and into a concave axially extending section 51. The portion 48 engaging the ends of the tines forces them radially inwardly until they pass a position parallel to the axis of the wheel whereupon the curved portion 50 of the die turns them gradually over and inwardly toward the axis. This turning in is completed by the portion 49. The concave portion 51 thereupon engages the tines on the exterior surface and also engages the adjoining main body of the shell and under high pressure contracts the adjoining main body and places the spokes under final tension in the proper mounting. The closing in dies 47 then being retracted, the wheel is ready for use.

Constructed according to this method and in this form there is much saving in material cost and in the fabrication and assembly. The assembly particularly is extremely rapid and adapted for quantity production by machinery.

Figures 8, 9:
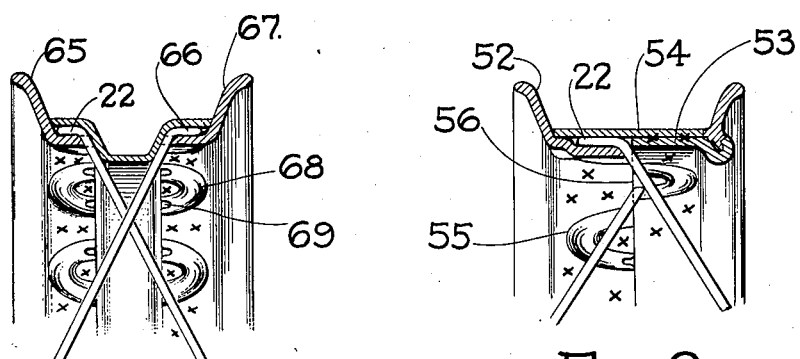
Fig. 8 is a partial axial cross section of still a different rim connection.
Fig. 9 is a section similar to that of Fig. 8 showing yet a different form of rim.

The form shown in Fig. 9 is a modification of the ordinary cylindrical rim. It consists in making a rim in three sections 52, 53 and 54 instead of in two sections 25—26. Section 52 comprises the outer flange and half of the cylindrical main body while section 53 comprises the gutter and the other half of the cylindrical main body. The two halves of the body contain depressions 55 of arc shape to receive the spoke loops. They are notched as at 56 in the edges in order to permit egress of these spoke loops. The portion 54 is in the form of a continuous cylindrical band of light cross section. The parts 52 and 53 are spot welded to this band within and between the loops as indicated by the cross marks. The spoke ends, of course, are bent so as to lie in an axial direction.

Figure 7:
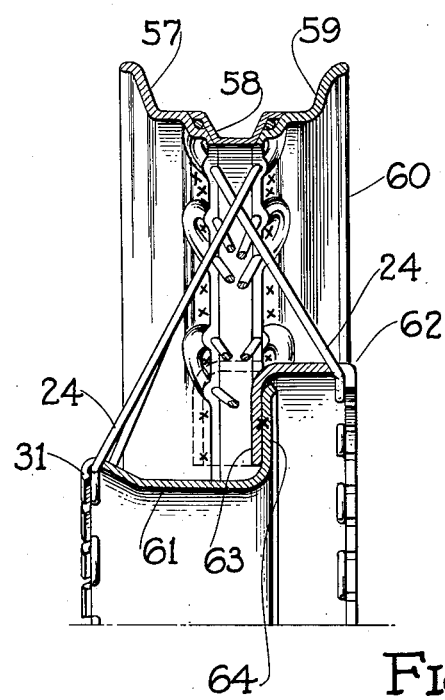
Fig. 7 is an axial half cross section of a modification having different rim and hub constructions.

The form of Fig. 7 shows an application of the invention to a drop center rim. Here the rim is made in three annular parts 57—58—59. The part 57 comprises one outer flange, an adjoining cylindrical portion and one side wall of the drop center. The part 59 comprises the other flange and adjoining cylindrical portion and one half of the side wall of the drop center. The middle portion 58 comprises the drop center itself and complemental halves of the side walls of the drop center. The portions of the side wall carried respectively by parts 57—59 and part 58, overlap each other. Either or both of them are provided with depressions 60 to receive the spoke loops between them. The parts are welded together within and between the spoke loops 61.

The heavy shell of this modification of Fig. 7 is constructed somewhat differently being formed in two parts 61 and 62 connected together by overlapping radial flanges 63—64 respectively. The inner and outer hub portions are provided with inwardly hooked tines projected through the spoke loops. The arrangement is such that in assembly the two parts of the hub 61—62 occupying the dotted line position, may be readily assembled with the spokes by moving the inner ends of the spokes toward each other while the inner ends of the hubs are moved axially toward each other. Thereafter, the flanges 63—64 are brought together, separating the ends of the hub shell and tensioning the spokes whereupon the flanges 63—64 are spot welded together and the wheel is ready for use.

The form of Fig. 8 is somewhat similar to the form of Fig. 7. It has to do with the rim construction. Here again the rim is of drop center form and comprised of annular parts 65—66—67. The part 65 comprises the outer flange and half of the adjoining cylindrical portion. So also does the part 67. But the drop center part 66 comprises the drop center is entirety and adjoining cylindrical parts overlying those cylindrical parts connected with the part 65—67. Depressions 68 are formed in the cylindrical parts connected with members 65 and 67 and receive spoke loops 22 developed axially. Notches 69 adjoining the side walls of the drop center 66 permit egress of the spokes from depressions 68.

What I claim as new and useful is:

1. The method of making a wire wheel which comprises winding wire stock to form two separate continuous annularly extending series of spokes corresponding to opposed sets of spokes of the finished wheel with all of the spokes of one series adapted to be secured to one end of the wheel hub and all of the spokes of the other series adapted to be secured to the opposite end of the wheel hub, assembling the spoke series so that the spokes in one series extend to the end of the hub on the opposite side of the wheel from the rim end of the spokes of that series, and thereafter securing the spoke series to the hub and rim members to form the completed wheel.

2. The method of making a wire wheel which comprises winding wire stock to form two separate continuous annularly extending series of spokes corresponding to opposed sets of spokes of the finished wheel with all of the spokes of one series adapted to be secured to one end of the wheel hub and all of the spokes of the other series adapted to be secured to the opposite end of the wheel hub, assembling the spoke series so that the spokes in one series extend to the end of the hub on the opposite side of the wheel from the rim end of the spokes of that series, thereafter securing the spoke series to the hub and rim members to form the completed wheel, and spacing the rim connections of the series of spokes apart by securing the rim portions to opposite sides of a drop center element.

3. The method of making a wire wheel which comprises winding wire stock to form two separate continuous annularly extending series corresponding to opposed sets of spokes of the finished wheel with the spokes of each separate series lying entirely on that side of the wheel to which hub portion they are secured, assembling the respective spoke series with respective hub tines and rim members upon the same side of the wheel, and thereafter securing the spoke series to the hub and rim members to form the completed wheel, and tensioning the spokes of both series by manipulation of the tines of a hub portion to which the spokes are secured.

4. The method of making a wire wheel which comprises winding wire stock to form two separate continuous annularly extending series of spokes corresponding to opposed sets of spokes of the finished wheel with all of the spokes of one series adapted to be secured to one end of the wheel hub and all of the spokes of the other series adapted to be secured to the opposite end of the wheel hub, assembling the spoke series so that the spokes in one series extend to the end of the hub on the opposite side of the wheel from the rim end of the spokes of that series, and thereafter securing the spoke series to hub tines and rim members to form the completed wheel, and tensioning the spokes of both series by manipulation of the tines of a hub portion to which the spokes are secured.

5. The method of making a wire wheel which comprises winding wire stock to form two separate continuous annularly extending series of spokes corresponding to opposed sets of spokes of a finished wheel and each series being arranged so that all of the spokes of each respective wire are adapted to be secured to the same end of a hub, each continuous series having a series of loops at their hub and rim ends, assembling the rim and loops of the two series adjacent each other between radially inwardly projecting flanges of two annular sections of a rim, spot welding said flanges, and securing the hub end of said loops to the opposite ends of a hub shell.

6. In the method of making a wire wheel, the procedure which comprises winding a strip of wire stock into a continuous annularly extended series of spokes, all of the spokes of said wire arranged to be secured to the same end of a hub, assembling the spoke series on the hub and rim members, and thereafter securing the spoke series to the hub and rim members in said annularly extended series relation.

7. The method of making a wire wheel, which comprises winding wire stock to form two separate continuous annularly extended series corresponding to opposed sets of spokes of the finished wheel, with the spokes of each separate series lying entirely on that side of the wheel to which hub portion they are to be secured, assembling the respective spoke series with the respective hub and rim members upon the same side of the wheel, and thereafter securing the spoke series to the hub and rim members to form the completed wheel.

JOHN P. TARBOX.